(12) United States Patent
Burstein et al.

(10) Patent No.: US 7,076,541 B1
(45) Date of Patent: Jul. 11, 2006

(54) METHOD AND APPARATUS PROVIDING DISTRIBUTED DOMAIN MANAGEMENT CAPABILITIES

(75) Inventors: Adam D. Burstein, Brooklyn, NY (US); Robert D. Gardos, New York, NY (US); Shamoun Murtza, Hackensack, NJ (US); Rong Zheng, Brooklyn, NY (US)

(73) Assignee: Register.com, Inc., New York, NY (US)

( * ) Notice: Subject to any disclaimer, the term of this patent is extended or adjusted under 35 U.S.C. 154(b) by 1027 days.

(21) Appl. No.: 09/871,886

(22) Filed: Jun. 1, 2001

Related U.S. Application Data

(60) Provisional application No. 60/219,342, filed on Jun. 5, 2000.

(51) Int. Cl.
   *G06F 15/173* (2006.01)
(52) U.S. Cl. ............ 709/223; 709/203; 709/217; 709/245; 709/246; 707/3
(58) Field of Classification Search ................ 709/2, 709/203, 217–219, 223–226, 229, 246, 245; 707/3
See application file for complete search history.

(56) References Cited

U.S. PATENT DOCUMENTS

| 6,298,341 | B1* | 10/2001 | Mann et al. ............... 707/3 |
| 6,314,469 | B1* | 11/2001 | Tan et al. ............... 709/245 |
| 6,338,082 | B1* | 1/2002 | Schneider ............... 709/203 |
| 6,442,549 | B1* | 8/2002 | Schneider ............... 707/10 |
| 6,654,830 | B1* | 11/2003 | Taylor et al. ............ 710/74 |
| 6,829,653 | B1* | 12/2004 | Tout ............... 709/245 |
| 6,867,789 | B1* | 3/2005 | Allen et al. ............... 715/744 |
| 6,880,007 | B1* | 4/2005 | Gardos et al. ............... 709/225 |
| 2001/0011274 | A1* | 8/2001 | Klug et al. ............... 707/9 |

OTHER PUBLICATIONS

The Gale Group, "NSI to Provide Interface Spec for New Registrars", Computergram International, n202, pNA, Oct. 9, 1998.*

* cited by examiner

*Primary Examiner*—Saleh Najjar
*Assistant Examiner*—Oanh Duong
(74) *Attorney, Agent, or Firm*—Hogan & Hartson L.L.P.

(57) ABSTRACT

A system and method facilitates communication of domain management functions and information between a front-end server, utilized for example by an unaccredited registrar or other type of partner site, and a back-end server. Typically the back-end server has direct access to the shared registry system (SRS) and is of the type such as might be found within an accredited registrar. Communication between the front-end server and the back-end server is through a lightweight protocol. The front-end server generates a graphical user interface on an operator's terminal. An operator enters information to the front-end server through the graphical user interface and generates a message from the operator terminal to the front-end server. The front-end server parses the message, extracts information appropriate to the requested function, and generates a compact command message to send to the back-end server. Preferably, the back-end server receives the command through a command-line or similar interpreter and performs a function or extracts information as requested by the front-end server. A variety of DNS or zone file information can be altered using simple graphical user interfaces into which an operator enters change information. The front-end server parses the change information from the operator and passes data representative of that change information to the back-end domain manager server. The requested information or a completion message is sent from the back-end server using a similar lightweight protocol.

21 Claims, 6 Drawing Sheets

METHOD AND APPARATUS PROVIDING DISTRIBUTED DOMAIN MANAGEMENT CAPABILITIES

PRIORITY AND RELATED APPLICATION NOTICE

This application claims priority from U.S. provisional patent application Ser. No. 60/219,342, filed Jun. 5, 2000, which application is hereby incorporated by reference in its entirety. This application relates to U.S. patent application Ser. No. 09/560,433, filed Apr. 27, 2000, which application is hereby incorporated by reference in its entirety.

COPYRIGHT NOTICE

A portion of the disclosure of this patent document contains material subject to copyright protection. The copyright owner has no objection to the facsimile reproduction by anyone of the patent document or patent disclosure, as it appears in the U.S. Patent and Trademark Office patent file or records, but otherwise reserves all copyright rights whatsoever.

BACKGROUND OF THE INVENTION

1. Field of the Invention

The present invention relates generally to the Internet and more specifically to a method of managing aspects of an Internet domain, such as registration and modification of domain names and their associated records.

2. Description of the Related Art

Each computer on the Internet is identified by a unique Internet protocol ("IP") address. This address is a 32-bit number organized as four 8-bit values separated by periods such as 123.45.67.89. Such a numerical system, while useful as a routing address system for computer-to-computer communication, is not human user friendly. Consequently, domain names are used to allow users to more easily identify and connect to a target computer on the network. These user-friendly domain names (or "host names"), such as "register.com", are easy for users to remember and, since they map to a unique IP number, accurately identify the computer's IP address.

As with the underlying Internet address, domain names typically have a hierarchical organization, with the trailing portion of the domain name, such as .com, .net, .org, .us, .uk or .jp, representing the top-level domain. Top-level domains include global top-level domains (gTLD) and country specific or country code top-level domains (ccTLD). The global top-level domains include .com, .org, .net, .edu, .gov and .mil. Of these, the .edu, .gov and .mil gTLD's are restricted to use by entities meeting specific qualifications. Country code top-level domains are country specific in that they identify registrations within a given country. The specific country governs registration for the country code top-level domains. Some countries are "open" in that they allow any entity to register a domain name within its ccTLD. Other countries are "closed" and only allow entities that meet restrictions such as residency to register domain names in that ccTLD. Most domain users presently use one or more of the .com, .net or .org gTLDs.

The domain name entered by a user is sent over the Internet to a global network of servers called the "domain name system" (DNS), which receives the domain name as a request and translates the domain name into the target computer's numerical IP address. The numerical IP address is returned to the user's computer to enable it to connect to the target computer. Typically, after the user enters the domain name, the rest of the process is invisible to the user until the user connects to the target computer. The domain name system consists of a collection of root servers or DNS Servers that provide a directory linking domain names with corresponding IP addresses. There are presently thirteen root servers worldwide that contain authoritative databases listing all top-level domains. The collection of root servers is centrally managed for all global top-level domains to ensure that each computer on the network can be uniquely identified by unique domain names and numerical addresses.

A "registry" is an international organization or entity that is responsible for assigning domain names and Internet protocol addresses. Each country maintains its own registry, generally through a company or organization. The registry has the responsibility to record and update domain names and Internet protocol addresses, as well as the information associated with them, on the root servers. A registry is under contract from its respective government to control domain name registration. The registry may authorize other entities, known here as registrars, to conduct domain name registration and other aspects of the management of domain names and IP addresses.

A "registrar" is an organization or company that is authorized to provide registration services for all users of certain top-level domains, such as the .net, .org and .com global top-level domains. Registrars are presently authorized either by ICANN, the Internet Corporation for Assigned Names & Numbers, a U.S. governmental organization under the Department of Commerce, or by the registrar's respective government to control domain name registration. A registrar is authorized by the registry to act as an agent of the registrar to process domain name registration. The registrar has the responsibility to create and maintain a Whois database and zone files for its customers. Examples of registrars presently include Register.com and Network Solutions, Inc., both of which are authorized by ICANN.

A "registrant" is the individual or organization to whom a specific domain name is registered within the registry. Once a registrant has registered a domain name, paid the associated fees and met certain conditions, the individual or organization holds the domain name for use for a specific period of time. The registrant can use the domain name for such purposes as web hosting and e-mail. In many cases, the registrant may incorporate one or more domain names into an organizational identity or business. As such, a registration to use a particular domain name can be viewed as a significant asset for certain registrants.

The "shared registry system" (SRS) is a system that permits multiple registrars to provide registration services for the .com, .net and .org domains. The system is a shared database that holds information about domain names and their authoritative name servers. The shared registry system updates the root servers with information about the domain names within the .com, .org and .net gTLDs about every twenty-four hours in typical operation. The SRS allows accredited registrars to enter information about newly registered domain names into the SRS, and the information about the newly registered domain names is then uploaded to the root servers. Accredited registrars can update name server information within the SRS for domain names for which they are recognized as registrar. Accredited registrars are registered with the SRS and access the SRS through a secure and authenticated communication channel, such as through a secure socket level encrypted communication link.

The SRS facilitates the updating of domain name and IP address information and also provides a utility for identifying the registrar that registered a domain name, when the entry to the SRS was created and the authoritative name servers for the domain name.

Different entities may be responsible for registering and managing a significant number of domain names. It is consequently desirable to provide a management system that can allow an agent to register and manage a plurality of domain names for a plurality of different registrants.

SUMMARY OF THE PREFERRED EMBODIMENTS

An aspect of the present invention provides a domain management system comprising a front-end domain manager adapted for causing display of an interface on an operator terminal of a screen requesting operator input of information related to a domain. The front-end domain manager is adapted for communicating to a back-end domain manager over a communication link. The front-end domain manager receives an information change message from the operator terminal communicating domain information to be changed by the domain manager, extracts information from the information change message and generates a text string command message to be sent to the back-end domain manager.

Another aspect of the present invention provides a domain management system comprising a message processor receiving a request for a change of domain name information and extracting domain name change information from the request for the change of domain name information. A command message generator formats a command message as a text string and sends the command message over a network communication link to an associated domain manager having direct access to a shared registry system. A return message interpreter receives from the associated domain manager a return message including an indication of a success or failure of a command or function communicated to the associated domain manager from the command message generator.

Still another aspect of the present invention provides a domain management system having an authentication interface generator that generates a message that, when received by an operator terminal, at least in part causes display on the operator terminal of a request for authentication from a party seeking access to the domain management system. A domain identification interface generator generates a message that, when received by the operator terminal, at least in part causes display on the operator terminal of a request for input from an operator seeking access to the domain management system of a domain name to be an active domain name. A command message generator formats a command message as a text string and sends the command message over a network communication link to an associated domain manager having direct access to a shared registry system. A return message interpreter receives from the associated domain manager a return message including an indication of a success or failure of a command or function communicated to the associated domain manager from the command message generator.

BRIEF DESCRIPTION OF THE DRAWINGS

The embodiments and advantages of the present invention can be better understood in conjunction with the various drawings, which form a part of the disclosure of the present invention.

FIG. 7 illustrates an exemplary alias information change screen that might be used in an implementation of aspects of the present invention.

FIG. 8 illustrates an exemplary mail exchange server information change screen that might be used in an implementation of aspects of the present invention.

DETAILED DESCRIPTION OF THE PREFERRED EMBODIMENTS

Figure 1:
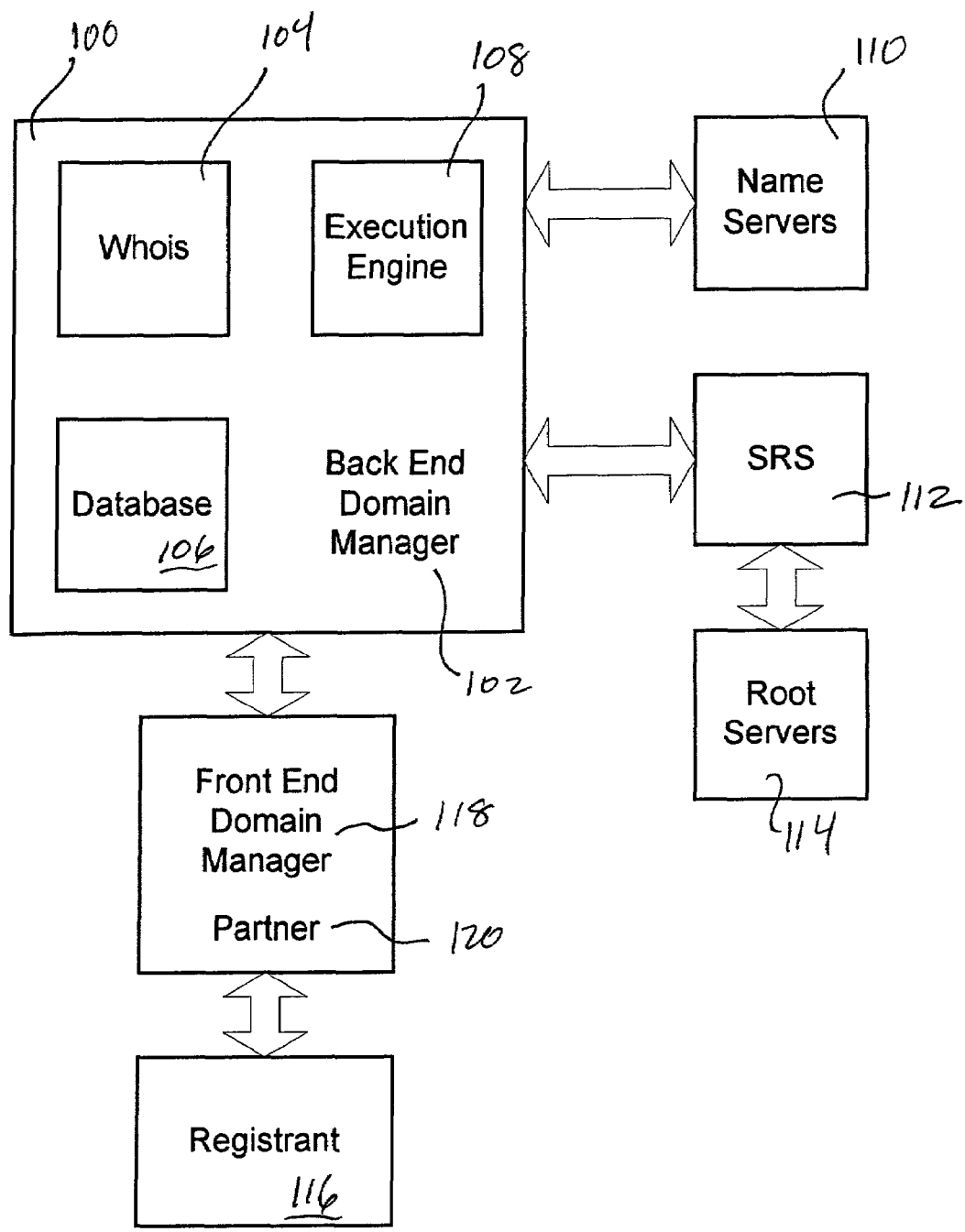
FIG. 1 illustrates schematically certain aspects of an exemplary system in which different aspects of the present invention operate.

Potential and current domain name registrants might use a variety of different mechanisms for registering new domain names, maintaining domains and updating domain information. An organization might register its domain names and manage its domains directly with an accredited registrar, where the registrar can directly access the shared registry system (SRS). Alternately, a registrant might register a domain name through an unaccredited registrar that does not have the authority to directly access the SRS. Unaccredited registrars generally access the SRS, register new domain names and update information about those domain names through an accredited registrar. So long as the unaccredited registrar can provide reliable and responsive service, many registrants may find this strategy desirable as providing a type of "one stop shopping." For example, the registrant might presently be using an Internet Service Provider (ISP) for a variety of services such as Internet access, e-mail service and website hosting. It is convenient then for the registrant to use domain name registration and management services provided through the ISP.

Preferred embodiments of the present invention facilitate the communication of domain management functions and information between a front-end server, utilized for example by an unaccredited registrar or other type of partner site, and a back-end server. Typically the back end server has direct access to the shared registry system (SRS) and is of the type such as might be found within an accredited registrar. Aspects of the present invention preferably provide a lightweight protocol for communicating between the front-end server and the back end server. In a particularly preferred embodiment, the front-end server causes a graphical user interface to be generated on an operator's terminal. An operator enters information to the front-end server through the graphical user interface and generates a message from the operator terminal to the front-end server.

The front-end server parses the message, extracts information appropriate to the requested function, and preferably generates a compact command message to send to the back-end server. An example of a compact command format is a text command that can be processed simply without significant parsing or interpretation. Preferably, the back-end server receives the command through a command-line or similar interpreter and performs a function or extracts information as requested by the front-end server. The back-end server then sends a return message including the requested information or a completion message to the front-end server preferably also using the lightweight protocol. On receiving the response from the back-end server, the front-end server interprets the message from the back-end server. The front-end server utilizes the return message from the back-end server in generating a graphical user interface for display on the operator terminal to signal the result of the function or inquiry.

The use of a lightweight communications protocol to communicate information between the front-end and back-end servers is particularly preferred in that it allows effective, efficient communication of information without consuming undesirable bandwidth. Significantly, preferred embodiments of the present invention provide fast processing of domain name registration requests, domain maintenance requests and domain information updates. This is because the compact command format can be extracted easily from the command message and because the command can be executed with comparatively little interpretation or pre-processing.

The command message structure might, for example, consist of a string of text fields, with fields within the text string separated by distinct, special characters. For example, the first field for messages transmitted from the front-end server to the back-end server might consist of a mnemonic for a command, the actual command or the name of a routine or function to be executed within the back-end domain manager. The end of this first field is indicated by a special character such as "%". Fields following the first special character are preferably variables or data used by the command or function defined within the first field. Fields subsequent to the first command field are preferably separated by a different kind of special character. For example, variable or data fields might be separated by the pipeline character, "|". Such a compact command message can be simply constructed by any number of programming techniques within the front-end server and can be readily interpreted in the back-end server.

The return message string structure used for communicating results from the back-end server to the front-end server might, for example, consist of a similar string of text fields, with fields within the text string separated by distinct, special characters. For example, the first field for messages transmitted from the back-end server to the front-end server might consist of a completion code indicating whether the operation specified by the preceding requesting message from the front-end server completed properly. For example, the back-end server may send a "0" or a "−1" for a failed command or function and may send a "1" for a successfully executed command or function. A special character such as "%" preferably is used to indicate the end of this first field in the return message. For failed commands or functions, the field following the failure message and special character preferably includes an error message communicating the nature of the error. For successful commands or functions, the field following the special character is preferably a return message. Of course, the return message or even the error message might have multiple fields of variables or data. Fields subsequent to the first command field are preferably separated by a different kind of special character. For example, variable or data fields might be separated by the pipeline character, "|". Such a compact command message can be simply constructed by any number of programming techniques within the back-end server and are readily interpreted in the front-end server.

Preferred embodiments of the present invention provide an interface and a toolset to allow an entity, such as an unaccredited registrar like a website hosting service or an Internet service provider (ISP), to act as agent for a domain name registrant for the registration, maintenance and modification of the registrant's domain names and domain information. Most preferably, aspects of the present invention provide a domain manager and management method adapted to allow an agent of a registrant to register and manage a plurality of domain names for a plurality of registrants. Preferred implementations of the present invention allow an agent to modify the zone file entries of a registrant, Whois information and name server information of that registrant. In particularly preferred implementations, a front-end of a domain manager may be provided on a partner site with a back-end of a domain manager on a back-end server that functions as an authoritative domain name server for the particular domain being managed. For this particularly preferred configuration, the domain manager has the ability to modify IP addresses, domain aliases, MX records and start of authority (SOA) information for the domain name.

FIG. 1 provides an illustration of aspects of preferred implementations of the present invention. FIG. 1 illustrates a number of different servers and network connections that might be accessed in the practice of different aspects of the present invention. In this illustration, the back-end server 100 is the server of an accredited registrar. It should be appreciated that, in many high volume applications, the illustrated server may consist of a number of servers configured as a single server farm or distributed over a number of different physical locations. All of the connections between different servers are two-way communication links, preferably over a wide area network such as the Internet using standard messaging protocols. Aspects of the back-end portion of the domain manager are embodied in this illustration as software 102 running on the back-end server 100 of the accredited registrar. In other embodiments, the back-end of the domain manager may be implemented as software on a fixed storage medium such as optical disk storage, magnetic disk storage, magnetic tape or one of the various forms of semiconductor memories. Similarly, the front-end of the domain manager may be embodied within a server, as illustrated in FIG. 1, or may be embodied as software in one of the known media. Still other aspects of the present invention provide one or the other of the front and back-ends of the domain manager as a method not fixed to any particular medium but instead embodied in the processes of aspects of the present invention.

Referring once again to FIG. 1, the back-end server 100 includes a number of facilities that might be accessed during operation of the back-end aspects 102 of a domain manager. The back-end domain manager 102 accesses the Whois database 104 and domain manager-specific database 106 within the server 100 in the manner described above. The back-end server 100 also contains an execution engine 108 that executes certain of the functions of the domain manager back end, including running various scripts, applets, servlets or programs as discussed below. The server 100 accesses name servers 110 over the Internet in the conventional manner. Similarly, the server 100 accesses the shared registry system 112 over the Internet to provide domain update information to the SRS that is later used to update the information on the root servers 114 that make up the domain name system (DNS).

Registrants 116, or different representatives of registrants, preferably access the domain manager functionality through front-end domain manager software 118 within the partner site's server 120. The partner is typically an unaccredited registrar. For example, the partner website might be a website hosting service or an Internet Service Provider, either of which might offer domain management services as a convenience to their customers. Most desirably, the appearance of the domain manager is customizable so that it can be personalized to the partner server 120.

It is desirable that the front-end of the domain manager implemented on the partner server 120 has functionality compatible with and highly coordinated with the back-end domain manager 102 within the accredited server environment 100. A full range of domain management capability is accomplished for domain names registered through the partner website or for which the partner website has become authoritative. In addition, accesses by the front-end of the domain manager are made through the back-end of the domain manager, which is capable of accessing the shared registry system (SRS) in substantially real time. Variations from real time access might, for example, be due to messages and requests passing through additional web servers and communication links. Thus a registrant 116 accessing the domain manager through the partner server 120 receives a substantially instantaneous updating of zone information to the SRS and a prompt level of coordination with DNS.

In the preferred implementations illustrated in the figures, the front-end of the domain manager may be a web-based application and is preferably installed within the web servers of partner website that is associated with an accredited registrar. The functionality of the front end of the domain manager is accessible through text links on web pages in the familiar manner. The interface and the links may be written in hypertext markup language (HTML) or in a successor language such as XML providing similar and expanded functionality. HTML links and messages are processed within the front-end domain manager server to generate an appropriate information change request screen on an operator's terminal. The operator completes the information change request screen and returns a message to the front-end server, typically in the form of an HTML message. Most preferably, the front-end of the domain manager parses the HTML message and converts the context of the information change request screen and the information contained within the message into a text-based command message such as that described above. "Context" is used here to denote the fact that a final information change request screen generally follows a sequence of screens that gather information such as authorization data and the identity of the active domain name. Necessary portions of such information may preferably be included in the text-based command message passed from the front-end portion of the domain manager to the back-end portion of the domain manager.

The message is passed from the front-end server to access further functionality within the back-end server aspects of the domain manager. The functionality within the back end server may include functions to extract information from one or more sources of information including, for example, the SRS or one of possibly many Whois databases. Other functionality within the back end server may include functions that register or effect changes to domain information. The functions executed by the back end domain manager may, for example, be written in one of the known scripting languages and preferably provide access to resources such as database engines within the back end domain manager's server environment. It should be understood, however, that the illustrated implementation might be written in a number of different messaging languages, may or may not access functions written in scripting languages, and may access a variety of different backend applications to achieve the described message interchanges, tools and utilities. Moreover, the illustrated embodiments may be partially or wholly contained within web servers and may or may not access applications servers for further functionality. Depending on the traffic and number of domain names that are being managed, all of the back-end domain manager functions described here may be implemented on a single server while in other installations the system may require a farm of web servers.

The front-end server 120 generates a sequence of operator screens to prompt for information necessary to effect domain name registration or domain changes. For example, if a change in domain name information is to be performed, such as any of the functions associated with the various interfaces illustrated in FIGS. 2–11, the front-end server establishes a context for an information change request screen and collects the information to execute those functions. The interfaces generated on the operator terminal by the front-end server establish a context for an information change request screen and provide an information change request screen to be completed by an operator and sent by the operator to the front-end server. The front-end server, for example by parsing the messages to extract relevant information and commands, processes HTML messages from the operator terminal. This extracted information is combined with the context of the information change request screens. The front-end server uses the context information and the change request information provided by the operator to generate a change request command in a compact command structure. The compact command structure including the context information and the change request information is transmitted to the back-end server for further processing.

It will be understood that, while this discussion is in terms of a domain name information change request, a similar protocol and set of processes can be used to effect initial domain name registration and inquiries that are made in the course of maintaining a domain name.

A number of programming languages could be used to construct the common gateway interface ("CGI") program within the front-end server 120 that generates the various interfaces illustrated in FIGS. 2–11. Each of the graphical interfaces, screens or GUIs may be constructed by conventional software programming techniques known in the art, such as visual builders. Preferably, the same programming or scripting language is used to identify a context for a given operator interface, to extract information from the HTML or other messages sent by the operator interface to the front-end server, and to generate the preferred compact command message to be sent to the back-end server. A particularly preferred embodiment implements the front-end functionality of the domain manager within a CGI program written in PERL, C or a scripting language. This code accesses in most cases a database that coordinates and accomplishes much of the functionality of the front-end of the domain manager, providing a sequence of interfaces that prompts the operator for the information needed to perform registration, management or change functions. This CGI shell either extracts information from the context and change request messages or accesses a program that extracts the needed information. Similarly, either the CGI shell generates the compact command message to be sent to the back-end server or the CGI shell accesses a program to generate the compact command message.

The back-end of the domain manager 102 receives commands from the front-end of the domain manager within the partner server environment. The back-end of the domain manager may be a distinct program or may be part of a database engine within the server environment. Regardless, received commands are processed and preferably access one or more database engines that perform the database functions of the back-end of the domain manager, such as storing information, searching through records, accessing records, and modifying records. An underlying shared access application program, for example a shared registration system application program, performs all DNS root server functions such as storing information, searching through records, accessing records and modifying records. Information is transmitted from the registrar to the SRS and then later the SRS generates flat files including the domain name information changes input through the database application program cause the SRS to be updated.

A preferred embodiment of the present invention provides a system and method that facilitates entities acting as agents to manage plural domains for plural registrants. The invention might include a back-end domain manager capable of coupling to the shared registry system and capable of performing a number of domain management functions. The domain manager may in preferred implementations reside in part on a back-end server of an accredited registrar and in part on a front-end server of a partner website that has made the server of the accredited registrar authoritative for at least plural domain names. The front-end server preferably can prompt an operator for the information needed to conduct registration, maintenance or implement changes to domain information by generating a sequence of simple graphical user interfaces to cause an operator to enter change information. Information input by the operator is extracted by the front-end server and is formatted in a compact command message, for example as a text command message. The front-end end server passes that command message change information to the back-end of the domain manager. The back-end server can alter a variety of DNS or zone file information in response to the requests within the command message. The domain manager passes the change information directly to the SRS and from the SRS to the root servers; the SRS updates the root servers asynchronously but on a regular basis, for example on a daily basis. Most preferably, the combined aspects of the domain manager have substantially direct access to the shared registry system and one or more authoritative Whois database. The domain manager may also provide a variety of utilities that allow an operator to perform diagnostics on the domain, its name and its registration.

Present embodiments of the back-end of the domain manager utilize an Oracle database engine. This is a particularly preferred database solution, although other solutions are presently known and other implementations of appropriate solutions are to be expected in the future. The database, as a whole, provides a great deal of information pertaining to the domain's zone information (i.e., domain name servers, IP addresses, aliases, mail exchange servers, etc.), as well as information pertaining specifically to how the domain name was registered. Most preferably, the database segments domain-specific information into well-normalized tables. These tables contain a complete historical record of domain name registrations, modifications, and bills. For instance, by scanning particular tables in the database, one can glean information regarding the changes to IP address which have been initiated, as well as which user (either the registrant or an agent acting on their behalf) performed the modification. Separately, one can determine changes to name servers, mail exchange servers, and more.

The back-end domain manager 102 interacts with the presently preferred Oracle database through the use of PL/SQL stored functions and procedures. Most preferably, the domain manager application is not authorized to perform ANSI SQL statement requests on the database itself. This allows for a single transaction to occur through the concept of a function or procedure initiating each of the ANSI SQL statements. Additionally, there is the significant added benefit of security and reliability.

Figure 2:
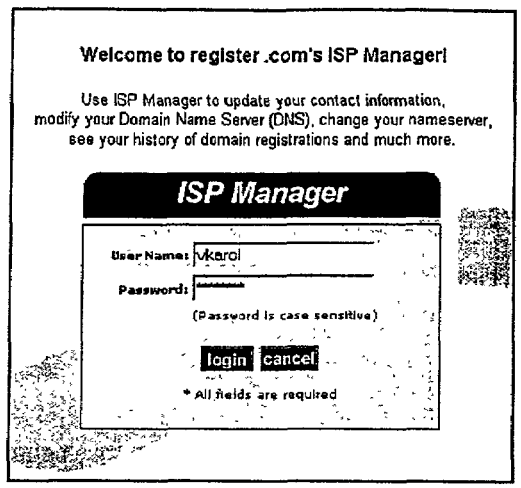
FIG. 2 illustrates an exemplary start screen that might be used in an implementation of aspects of the present invention.
Figure 3:
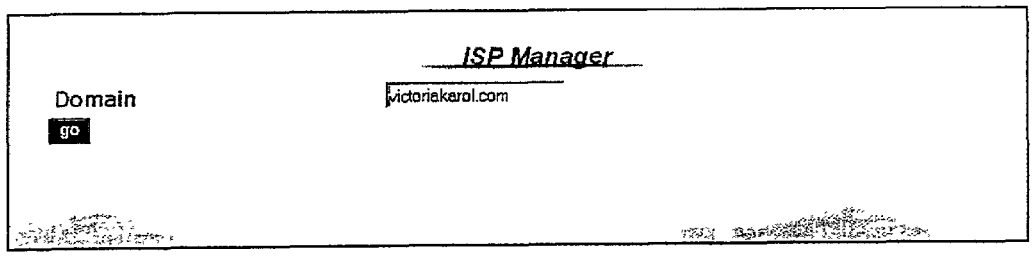
FIG. 3 illustrates an exemplary domain name selection screen that might be used in an implementation of aspects of the present invention.

Having described the overall structure, this discussion now turns to illustrations of how particularly useful functions are implemented in a preferred aspect of the present invention. Referring to FIG. 2, a start screen generated by the front-end domain manager is illustrated. In this illustrative implementation, it is assumed that the operator accessing the domain manager is acting as an agent for a domain name registrant to modify some information about the domain name or perform another domain management function. Such a start screen preferably requests identification and authentication information from the operator to ensure that the agent is authorized to use the domain manager and to make changes for that domain. The authentication information is collected by the front-end of the domain manager and passed to the back-end domain server for confirmation. Once logged in or otherwise authenticated through a screen like that illustrated in FIG. 2, a screen such as that illustrated in FIG. 3 appears to prompt for the domain name to be modified or managed by the operator. All communications following the authentication screen are preferably encrypted between the front-end server and the back-end server. The operator enters the domain name to be active for the initial portion of the session and sends the message to the front-end server. The operator sends the name to the front-end domain manager server, which accesses information about the domain name from the back-end server and returns a function select screen.

Information is gathered about the domain name by the back-end server and passed to the front-end server. The front-end domain manager server sends a screen that allows the operator to select the management functionality to be executed. For example, the front-end domain manager may cause display of a screen like that illustrated in FIG. 4. Most preferably, the returned function screen illustrates all of the functions that can be performed on that domain name by that operator. It should be appreciated that certain functionality is accessible only to the original or authorized registrar for a domain name and so certain registrant agents may be unable to perform certain maintenance or management functions. When the agent initially registered the domain name for the registrant through the domain manager, the agent is preferably automatically recognized as authoritative for that domain name. An agent is also preferably recognized as authoritative when the agent has previously accessed the domain manager and received authentication for that particular domain name.

For agents not already recognized as authoritative, further authentication is preferably requested. Operators that are technical contacts or domain name administrators may enter a domain name to be managed and the front-end domain manager issues a screen such as that illustrated in FIG. 5 to request further authentication. As shown in this example, the screen generated by the front-end domain manager might inform the operator not already recognized as authoritative that the operator is asking to be recognized as the authoritative zone and technical contact of the indicated domain name. The screen of FIG. 5 indicates that authorization for the operator's request must be confirmed from the administrative contact for the domain name. The operator clicks on the appropriate button to indicate that the indicated action is desired. The front-end of the domain manager sends a command to the back-end domain manager, which sends an e-mail to the administrative contact for the domain name and waits for confirmation from the administrative contact that authorization is proper. Upon authorization, the back-end domain manager recognizes the operator as the authoritative zone and technical contact for that domain name and sends an appropriate message through the front-end domain manager to the operator.

Note here that the back-end domain manager has accessed information about the administrative contact for the domain name. This is but one piece of information about a domain that might be accessed in any given management session. Some of the domain information might be stored within a database associated with or accessible from the back-end domain manager. On the other hand, locally stored information might not be current or complete. As such, the back-end domain manager preferably directly contacts the shared registry system (SRS) to retrieve information about a domain being managed. The SRS is the most authoritative source of data for .com, .net and .org domain name registration status and authoritative name server information, as all .com, .net and .org registrars update the SRS in real time. When the back-end domain manager alters information regarding a domain or a domain name, the back-end domain manager most preferably updates the SRS in real time by directly accessing the SRS to change the information.

The back-end domain manager preferably resides on the web servers of an accredited registrar so that the domain manager has direct access to the SRS. Domain names that can be managed include not only those registered directly through the accredited registrar, but also those registered through the accessing partner website. As discussed above, an accredited registrar may provide indirect registration services to unaccredited registrars, such as web hosting services or Internet service providers. All of these various registration channels can result in domain names being registered through the domain manager. All of these domain names can be managed through the domain manager, although an operator for one unaccredited partner website cannot manage a domain name registered through another partner website unless authorization is received.

The back-end domain manager preferably maintains a database of information for those domain names that were registered through the particular front-end domain manager presently accessing the back-end domain manager. When an operator attempts to access a domain name not registered through the presently accessing front-end domain manager, the back-end domain manager preferably issues a message to that effect. Different users of the back-end domain manager may have the ability to access different levels of functionality. It should be appreciated that practice of less than all of the functionality of both of the front-end and back-end domain managers is an anticipated practice of the present invention.

Referring once again to FIG. 4, an operator can select among three general categories of functions: diagnostics (ping, Whois, host, dig, SRS); DNS/zone file information (IP, alias, MX, SOA, all) and registrar (nameserver, tech, zone). One of the types of information that can be modified by the domain manager is DNS/zone file related information, which is the information contained in or related to name server or zone file entries. Since zone files are stored on the name servers that are authoritative for the domain name, any modifications to this information must be entered into the name server responsible for that domain name. Because of this presently standard characteristic of zone files, only those with direct access to the specific name server can perform edits to the zone file for a domain name. Operators accessing implementations of the back-end domain manager can edit zone file information for a domain name only if the domain name lists the front-end domain manager's server as authoritative for the domain name. This is because the front-end domain manager can submit updates to associated name servers, but cannot directly modify DNS (domain name system) entries on name servers administered by other organizations where that front-end domain manager is not recognized as authoritative. If a domain name lists a different organization's name servers as authoritative for the domain name, options to edit zone file information will not be available from that front-end domain manager.

Figure 4:
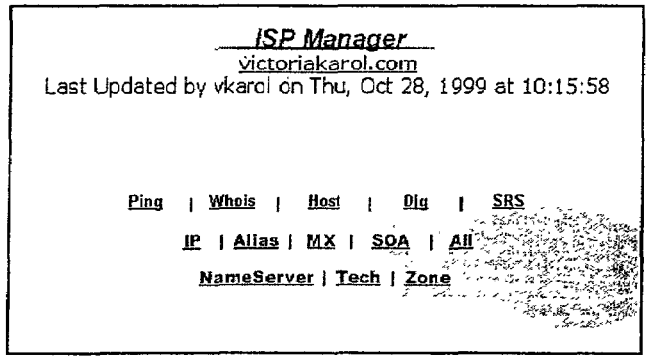
FIG. 4 illustrates an exemplary function selection screen that might be used in an implementation of aspects of the present invention.
Figures 5, 6:
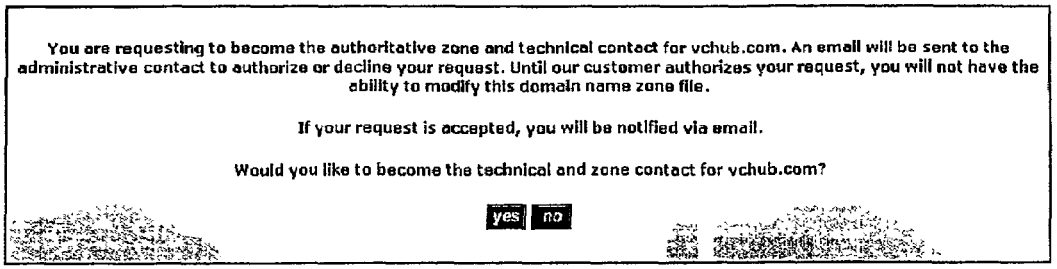
FIG. 5 illustrates an exemplary authorization facilitation screen that might be used in an implementation of aspects of the present invention.
FIG. 6 illustrates an exemplary IP address information change screen that might be used in an implementation of aspects of the present invention.
Figure 9:
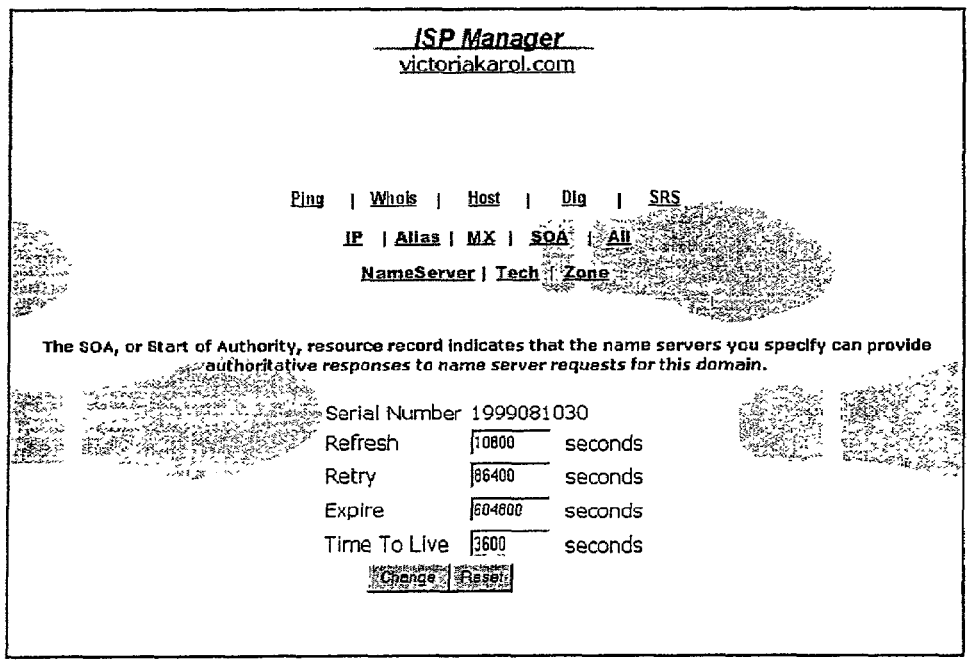
FIG. 9 illustrates an exemplary start of authority information change screen that might be used in an implementation of aspects of the present invention.

When the front-end domain manager is recognized as authoritative, the front-end domain manager preferably generates on the screen of FIG. 4 function options including IP, alias, MX, SOA and all. The IP designation references the domain name's IP address from the zone file, as derived by the back-end domain manager, and allows access to a screen such as that shown in FIG. 6 that facilitates changes to the IP address. The most common use of this screen is to connect a domain name to desired appropriate web servers or web sites on the Internet. Operators of the domain manager can edit the IP address and create "A Record" host entries as long as the front-end domain manager's server is the authoritative name server for the domain name. Host domain names are entered as indicated and the desired corresponding IP address is entered. When the screen is complete either with original or changed information, the operator sends the completed screen to the front-end domain manager. The front-end domain manager processes the message and sends a command to the back-end domain manager that sends the information regarding the IP address information or changes directly to the shared registry system (SRS) for immediate updating of the DNS information within the SRS.

Figures 7, 8:
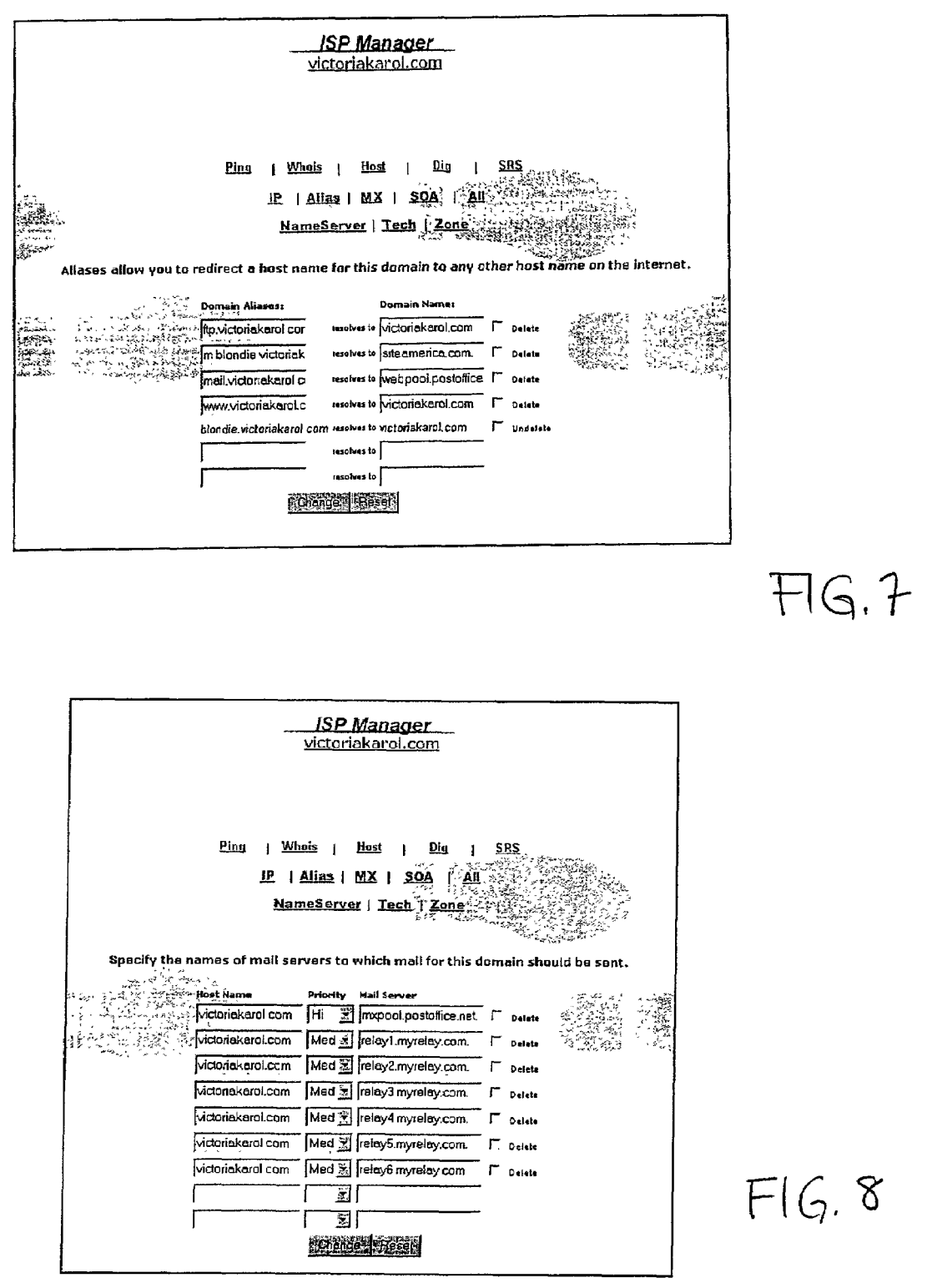

Another piece of zone information that can be edited from the front-end domain manager is the domain alias information, which can be used to create or modify "C-names". Clicking on the alias link brings up an alias screen such as that shown in FIG. 7. As illustrated in FIG. 7, the front-end domain manager retrieves from the back-end domain manager the aliases associated with a domain name to provide on an operator display the aliases and the domain names to which the aliases resolve. Here, as with other information retrieved for various aspects of the front-end domain manager, the back-end domain manager looks both to an internal database for entries related to the domain name and to the SRS as the most authoritative collection of information. Here, as with other information retrieved by the back-end domain manager, the information drawn from the SRS is considered to be accurate and is used rather than information within the local database whenever the information requested is in both the local and SRS databases.

If no aliases have been established for the domain name, the www and ftp aliases are set to default settings. It is possible to change these aliases so that the aliases resolve to different domain names, as desired. This is accomplished in the illustrated embodiment using conventional graphical user interface screens. New domain aliases can be created in similar fashion by first entering the alias to be created and then entering the domain name to which the new alias should resolve. Following completion of the alias screen changes, an operator sends the data to the domain manager and the domain manager updates the information related to aliases within the SRS.

Another type of DNS/zone information modifiable through the domain manager are the mail exchange features indicated in the function selection screen illustrated in FIG. 4 with the designation MX. Taking the MX link preferably causes the front-end domain manager to return a mail exchange server screen similar to that illustrated in FIG. 8. From the illustrated page, an operator specifies the mail servers that are to handle e-mail for the active domain name. The active host domain name is entered into the fields on the left hand side of the screen. The corresponding mail servers that are to distribute e-mail are entered in the corresponding slots on the right hand side of the screen and the various e-mail servers are assigned priorities for handling the e-mail. Preferably a single primary mail server is identified as having the primary responsibility for distributing mail. Entries should be provided for the primary and each of the backup mail servers. Once the screen is completed the operator sends the screen to the front-end domain manager, which parses the message and generates an appropriate compact command message including the identities and priorities of the mail exchange servers. In response to the compact command message, the back-end domain manager updates the MX information within the zone file. Should an MX screen such as that illustrated in FIG. 8 be requested after mail servers have been initially designated, the back-end domain manager preferably retrieves the MX information from the zone file and passes the information in a return message to the front-end server to fill in the screen to facilitate changes. Should complete changes be desired, the MX screen is preferably capable of being reset with a single click, as are the rest of the data screens illustrated in this discussion.

Another aspect of zone information that can be changed through the domain manager is the start of authority record, accessed through the function selection screen of FIG. 4 by selecting the SOA link. When this link is selected, the front-end domain manager returns a SOA record screen such as that illustrated in FIG. 9. As shown, the domain manager allows setting or modification of the refresh, retry, expire and time to live data associated with the start of authority information. New values can be entered into any of these fields and the screen with the changed information can be sent to the front-end domain manager for processing in the usual manner. As with all of the information change screens discussed here, the domain manager sends to the operator an indication that the changes were received and entered by the domain manager. The back-end domain manager passes the information on to the SRS and the information within the authorized domain name servers is updated when those servers are next reloaded with the data from the SRS. The domain name servers might be updated, for example, every twenty-four hours.

Referring once again to the function selection screen of FIG. 4, the domain manager also facilitates updating information more specific to the registrar. These functions allow an operator to change information maintained by the back-end domain manager for updating the information in the registry and any applicable Whois databases. Such information is typically not included in the domain name's zone file. Modifications to this information is therefore preferably limited to systems directly linked to the registry; that is, through an accredited registrar. Selecting any of the nameserver links illustrated in the various figures, including in the master function select screen of FIG. 4, preferably causes the front-end domain manager to return a screen like that illustrated in FIG. 10. The nameserver screen illustrated in FIG. 10 allows an operator to designate the nameserver that is to be authoritative for the active domain name. Note that the presently active domain name is indicated in this information change screen at the top of the screen. Most preferably this convention, or another convention that displays the active domain name in a consistent position on all information change screens, is provided throughout the information change screens.

To assign a new primary or secondary authoritative name server for the active domain, an operator selects one of the primary or secondary fields and edits the information by deleting the current information and entering the name of the new authoritative name server. The operator sends the changed screen information through the front-end domain manager to the back-end domain manager and then the back-end domain manager checks to ascertain the IP address of the newly identified name server. If a valid IP address is not returned, the domain manager might identify this as an error condition and request entry of a new domain name for the authoritative name server. Otherwise, the front-end domain manager asks for the operator to enter the IP address for the authoritative name server. This allows the operator to identify a new name server and to associate an IP address with that name server. Once the changes are entered, the operator sends the screen to front-end domain server and into the back-end domain manager. The back-end domain manager checks the validity of the information provided through this screen before sending a confirmation message through the front-end server to the operator. After error checking, the back-end domain manager updates the SRS to change the identity of the authorized domain name servers. Once the change is effected, further changes to registrar-related and DNS/zone file information cannot be made through the same instance of the domain manager.

As with the nameserver information, certain aspects of the contact information for a domain name can also be changed through domain manager. For example, selecting the tech link on the function select screen of FIG. 4 allows an operator to select a technical contact for a particular domain. Similarly, an operator selects the zone contact link to change contact information and enters the information about the organization and person within that organization who is authorized to request and make changes to the zone file.

Figure 11:
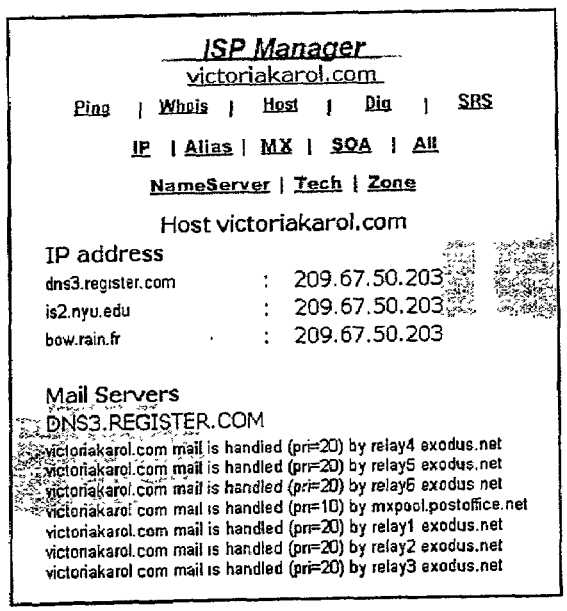
FIG. 11 illustrates an exemplary response screen that might be generated by the domain manager to communicate a response to a diagnostic utility such as the particularly illustrated response to a host query.

Particularly preferred embodiments of a domain manager in accordance with the present invention provide a set of diagnostic tools for evaluating the state and working condition of a registrant's domain. An exemplary set of diagnostic functions is illustrated on the upper line of the function select screen of FIG. 4, including ping, Whois, host, dig and SRS. Selecting one of these functions runs the diagnostic function on the active domain name. The back-end domain manager runs the diagnostic function and returns the results in the form of response screen such as that illustrated in FIG. 11. FIG. 11 shows the results of the host function, which accesses the SRS and lists out the IP address for the host domain name and the aliases associated with that same IP address. The host utility also returns information about the mail exchange servers for the host domain name. Further discussion of the diagnostic functions is now set forth.

The ping utility is used to determine whether or not an address at a certain domain name is active or responding. When the ping utility is selected, the domain manager sends a packet of information to the domain name being diagnosed and waits for a response. If the target domain is active and operating properly, the domain server returns a message including the IP address to which the domain name resolves. Most preferably, the ping utility also returns the time required for the packet to make the round trip from the back-end domain manager to the target domain and a response to return to the back-end domain manager.

The Whois utility causes the domain manager to issue a Whois query. A Whois database is a database maintained by a registrar that contains information about the domain names registered through the registrar. The information within the Whois database might include the registering organization (i.e., the registrant) and various contact information for the technical, zone and administrative contacts for the domain. Consequently, the Whois utility causes the domain manager to issue a Whois query. The Whois database for the target domain returns the identity of the registrant and the contact information related to the domain name. Different Whois databases will return different sets of information due to the non-standard definition of Whois databases.

Figure 10:
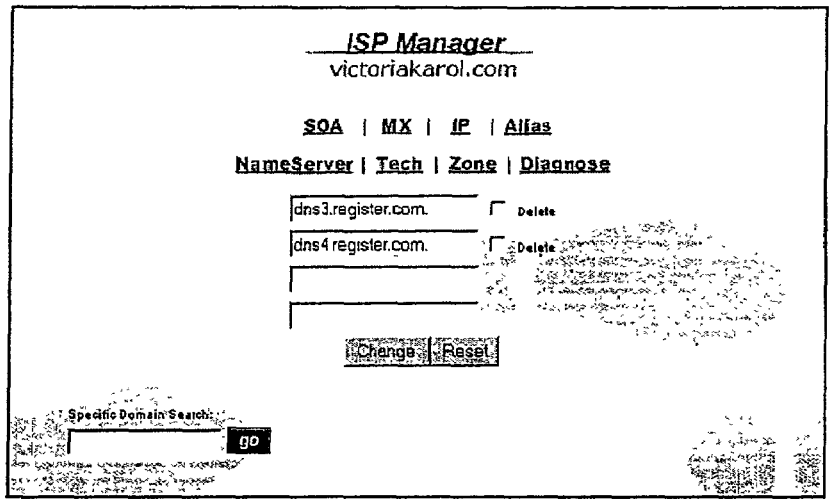
FIG. 10 illustrates an exemplary nameserver information change screen that might be used in an implementation of aspects of the present invention.

The host utility causes the back-end domain manager to make a host inquiry of the domain name, which returns the information illustrated in FIG. 10. This utility can be used to ensure that the IP address for a site has properly propagated through the network of domain name servers. In this regard, the domain manager executing the host utility queries a plurality of different name servers, for example three name servers, to determine if all of the name servers resolve the same IP address for the target domain name. A positive result from the host query indicates that the domain name has propagated well through the name server network.

Other diagnostic functions are preferably provided by the domain manager to operators to efficiently act as agents in managing a registrant's domain include the dig and SRS utilities. The dig utility queries one of the thirteen root servers to find the name server that is authoritative for a specific domain name. A dig can be used to determine whether the information for a domain name has been updated on the root server level by the shared registry system or the registry responsible for each country code top-level domain. The SRS utility causes the back-end domain manager to search the shared registry system to determine if a domain name is registered, when it was registered, when it was last modified and what name servers are authoritative for the domain name.

For most of these diagnostic utilities, the back-end domain manager can execute the utility regardless of the authoritative name server for the domain name. This is different for the SRS utility, where the domain name server can only execute SRS queries for domains within the .com, .net and .org top-level domains and for domains that use front-end servers associated with the back-end server that are defined as the authoritative domain name servers.

While aspects and certain advantages of the present invention have been described herein with reference to certain preferred embodiments of the present invention, it should be appreciated that the present invention is not limited to the particular embodiments thereof. Those of ordinary skill in the art will appreciate that modifications and variations on the basic teachings of the present invention might be made without varying from the fundamental teachings thereof. Consequently, the scope of the present invention is to be determined from the claims, which follow.

What is claimed is:

1. A domain management system comprising a front-end domain manager adapted for causing display of an information input screen on an operator terminal, the information input screen requesting that an operator input information related to a domain name, the front-end domain manager adapted for communicating to a back-end domain manager over a communication link, the front-end domain manager receiving information change message from the operator terminal, the information change message including domain name information to be changed by the back-end domain manager, the front-end domain manager extracting information from the information change message and generating a text string command message to be sent to the back-end domain manager, the text string command message comprising a text command specifying an information change function to be performed by the back-end domain manager and further comprising change information to be used by the back-end domain manager in performing the information change function.

2. The domain management system of claim 1, wherein the information extracted from the information change message is combined with context information to generate the text string command message.

3. The domain management system of claim 1, wherein the front-end domain manager receives response messages from the back-end domain manager formatted as text strings, the response messages indicating success or failure of information change instructions within corresponding text string command messages.

4. The domain management system of claim 1, wherein fields within the text string command message are separated by special characters.

5. The domain management system of claim 3, wherein fields within the text string of the response message are separated by special characters.

6. A domain management system, comprising:
  a message processor receiving a request for a change of domain name information and extracting domain name change information from the request for the change of domain name information;
  a command message generator formatting a command message as a text string, the command message identifying an information change function and comprising the domain name change information, the command message generator sending the command message over a network communication link to an associated domain manager having direct access to a shared registry system; and
  a return message interpreter receiving from the associated domain manager a return message including an indication of a success or failure of the information change function identified within the command message communicated to the associated domain manager from the command message generator.

7. The domain management system of claim 6, wherein the associated domain manager comprises information change means for communicating a request to change information about a domain name identified in the command message to a database authoritative for the information about the domain name and for generating confirmation to be included in the return message.

8. The domain manger of claim 7, wherein the associated domain manager uses a command line interpreter to execute the information change function within the command message.

9. The domain management system of claim 6, wherein the network communication link includes the Internet.

10. The domain management system of claim 7, wherein the information change means resides on a server of an accredited registrar.

11. The domain management system of claim 7, wherein the information change means resides on a server capable of directly accessing a shared registry system.

12. The domain management system of claim 7, wherein the information change means resides on a server coupled to a second server capable of directly accessing a shared registry system.

13. The domain management system of claim 12, wherein the information change request is passed through the second server and to the shared registry system.

14. The domain management system of claim 6, wherein the authoritative database is a shared registry system.

15. A domain management system, comprising:
  an authentication interface generator that generates a message that, when received by an operator terminal, causes display of a request for authentication to a party seeking access to the domain management system;
  a domain identification interface generator that generates a message that, when received by the operator terminal, causes display on the operator terminal of a request for input of a domain name to be an active domain name from the party accessing the domain management system;
  a message processing section receiving an information change message from the operator terminal communicating domain information to be changed, the message processing section extracting information from the information change message and generating a text string command message, the command message identifying an information change function and comprising the domain name change information;
  a communication section sending the command message over a network communication link to an associated domain manager, the associated domain manager implementing the information change function using the domain name change information; and
  a return message interpreter receiving from the associated domain manager a return message including an indication of a success or failure of the information change function identified within the command message communicated to the associated domain manager from the command message generator.

16. The domain management system of claim 15, further comprising a diagnostic utility adapted to receive at least one diagnostic request about the active domain name and to generate a command message requesting execution of a corresponding diagnostic utility.

17. The domain management system of claim 16, wherein the diagnostic utility accesses a shared registry system when executed.

18. The domain management system of claim 15, wherein the information extracted from the information change message is combined with context information to generate the text string command message.

19. The domain management system of claim 15, wherein the front-end domain manager receives a response message from the back-end domain manager formatted as a text string.

20. The domain management system of claim 18, wherein fields within the text string command message are separated by a special character.

21. The domain management system of claim 19, wherein fields within the response message are separated by a special character.

* * * * *